(12) United States Patent
Dong et al.

(10) Patent No.: US 9,336,040 B2
(45) Date of Patent: May 10, 2016

(54) TECHNIQUES FOR REMAPPING SESSIONS FOR A MULTI-THREADED APPLICATION

(71) Applicant: Intel Corporation, Santa Clara, CA (US)

(72) Inventors: Yao Zu Dong, Shanghai (CN); Kun Tian, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 14/486,270

(22) Filed: Sep. 15, 2014

(65) Prior Publication Data

US 2016/0077857 A1   Mar. 17, 2016

(51) Int. Cl.
| | |
|---|---|
| *G06F 9/455* | (2006.01) |
| *H04L 29/08* | (2006.01) |
| *G06F 9/54* | (2006.01) |
| *G06F 9/44* | (2006.01) |

(52) U.S. Cl.
CPC .......... *G06F 9/45558* (2013.01); *G06F 9/4443* (2013.01); *G06F 9/541* (2013.01); *H04L 67/10* (2013.01); *G06F 2009/4557* (2013.01)

(58) Field of Classification Search
CPC ............................... G06F 9/541; G06F 9/4443
USPC ........................................ 718/1; 719/328, 329
See application file for complete search history.

(56) References Cited

U.S. PATENT DOCUMENTS

| | | | |
|---|---|---|---|
| 6,360,262 B1 * | 3/2002 | Guenthner | H04L 29/06 709/203 |
| 7,171,473 B1 * | 1/2007 | Eftis | H04L 12/581 709/224 |
| 2004/0010612 A1 * | 1/2004 | Pandya | H04L 29/06 709/230 |
| 2005/0063300 A1 * | 3/2005 | Dominic | H04L 29/12292 370/216 |
| 2006/0010227 A1 * | 1/2006 | Atluri | G06F 11/1453 709/217 |
| 2009/0213850 A1 * | 8/2009 | Viger | H04L 47/40 370/389 |
| 2012/0093150 A1 | 4/2012 | Kini | |
| 2015/0205672 A1 * | 7/2015 | Bissett | G06F 11/1407 714/18 |

FOREIGN PATENT DOCUMENTS

EP   2996042 A1   3/2016

OTHER PUBLICATIONS

Folkerts "Multi-tier Intrusion Detection by Means of Replayable Virtual Machines", Aug. 2008.*
Dunlap et al., "Execution Replay for Multiprocessor Virtual Machines", VEE '08, Mar. 5-7, 2008, 10 pages.
Cully et al., "Remus: High Availability via Asynchronous Virtual Machine Replication", NDSI '08, USENIX Symposium on Networked Systems Design and Implementation, 2008, 14 pages.
Dong et al., "COLO: COarse-grained LOck-stepping virtual machines for non-stop service", Proceedings of the 4th annual Symposium on Cloud Computing, SOCC '13, 2013, 24 pages.

(Continued)

*Primary Examiner* — Phillip H Nguyen
(74) *Attorney, Agent, or Firm* — Alpine Technology Law Group LLC

(57) ABSTRACT

Examples may include a remapping of sessions for a multi-threaded application that may be executed at a server or a client coupled to the server via a plurality of transmit control protocol (TCP) connections. Sessions may be remapped such that the multi-threaded application may expect to route sessions through a same TCP connection but the sessions are actually outputted via separate TCP connections.

22 Claims, 11 Drawing Sheets

(56) References Cited

OTHER PUBLICATIONS

Extended European Search Report received for European Patent Application No. 15180839.1, mailed on Feb. 3, 2016, 7 pages.
Salam A Abdel, et al. "SPDY Multiplexing Approach on Long-Latency Links", Apr. 6, 2014, 6 pages, IEEE Wireless Communications and Networking Conference.
Stewart, et al. "SCTP Sockets Mapping" Internet draft, Jul. 13, 2000, 22 pages, retrieved from www.watersprings.org/pub/id/draft-stewart-sctpsocket-sigrtan-00.txt.

* cited by examiner

700

INTERCEPT, AT CIRCUITRY FOR A SERVER ARRANGED TO HOST A PRIMARY OR A SECONDARY VM CAPABLE OF SEPARATELY IMPLEMENTING AN APPLICATION, FIRST AND SECOND SOCKET API CALLS MADE FROM THE APPLICATION, THE FIRST AND SECOND SOCKET APIs ARRANGED TO ROUTE RESPECTIVE FIRST AND SECOND SESSIONS FOR EXPECTED OUTPUT THROUGH A SAME TCP CONNECTION FROM AMONG A PLURALITY OF TCP CONNECTIONS COUPLED TO A CLIENT OF THE SERVER, THE FIRST AND SECOND SESSIONS GENERATED BY THE APPLICATION RESPONSIVE TO DATA RECEIVED FROM THE CLIENT
702

GENERATING A SESSION INDEX USING RESPECTIVE FIRST AND SECOND IDENTIFIER INFORMATION FOR THE FIRST AND SECOND SESSIONS
704

REMAPPING THE FIRST AND SECOND SESSIONS FOR ACTUAL OUTPUT THROUGH SEPARATE TCP CONNECTIONS FROM AMONG THE PLURALITY OF TCP CONNECTIONS SUCH THAT THE SESSION INDEX IS CAPABLE OF BEING USED AT THE CLIENT TO RECOMBINE THE FIRST AND SECOND SESSIONS WITH THE SAME TCP CONNECTION
706

RECEIVE, AT A SERVER ARRANGED TO HOST A PRIMARY OR A SECONDARY VM CAPABLE OF SEPARATELY IMPLEMENTING A FIRST APPLICATION, FIRST AND SECOND SESSIONS VIA SEPARATE TCP CONNECTIONS WITH A CLIENT, THE FIRST AND SECOND SESSIONS GENERATED BY A SECOND APPLICATION AT THE CLIENT RESPONSIVE TO A REQUEST PREVIOUSLY SENT TO THE SECOND APPLICATION FROM THE FIRST APPLICATION
802

RECEIVE A SESSION INDEX HAVING IDENTIFIER INFORMATION FOR THE FIRST AND SECOND SESSIONS
804

REGROUP THE FIRST AND SECOND SESSIONS TO A SAME TCP CONNECTION BASED ON THE SESSION INDEX
806

FORWARD THE FIRST AND SECOND SESSIONS VIA THE SAME TCP CONNECTION TO RESPECTIVE FIRST AND SECOND SOCKET APIs FOR THE FIRST APPLICATION
808

```
RECEIVE, AT A CLIENT COUPLED TO A SERVER VIA A
PLURALITY OF TCP CONNECTIONS, FIRST AND SECOND
SESSIONS VIA SEPARATE TCP CONNECTIONS FROM AMONG
THE PLURALITY OF TCP CONNECTIONS, THE FIRST AND
SECOND SESSION GENERATED BY A FIRST APPLICATION
IMPLEMENTED BY A PRIMARY OR A SECONDARY VIRTUAL
MACHINE HOSTED BY THE SERVER AND OUTPUTTED FROM
THE SERVER VIA THE SEPARATE TCP CONNECTIONS, THE
FIRST AND SECOND SESSIONS GENERATED RESPONSIVE TO A
REQUEST PREVIOUSLY SENT TO THE FIRST APPLICATION BY A
SECOND APPLICATION AT THE CLIENT
902
```

```
RECEIVE A SESSION INDEX HAVING IDENTIFIER
INFORMATION FOR THE FIRST AND SECOND SESSIONS
904
```

```
REGROUP THE FIRST AND SECOND SESSIONS TO A SAME TCP
CONNECTION FROM AMONG THE PLURALITY OF TCP
CONNECTIONS BASED ON THE SESSION INDEX
906
```

```
FORWARD THE FIRST AND SECOND SESSIONS VIA THE SAME
TCP CONNECTION TO RESPECTIVE FIRST AND SECOND
SOCKET APIs FOR THE SECOND APPLICATION
908
```

*FIG. 9*

**Storage Medium *1000***

*Computer Executable Instructions for 700/800/1000*

*FIG. 10*

TECHNIQUES FOR REMAPPING SESSIONS FOR A MULTI-THREADED APPLICATION

TECHNICAL FIELD

Examples described herein are generally related to routing data generated by a multi-threaded program between a server and a client.

BACKGROUND

Network servers coupled with client computing devices are increasingly being arranged to support or host virtual machine(s) (VMs) that enable multiple operating systems and/or applications to be supported by a single computing platform. Also, when high availability is desired for servers hosting VMs, a primary VM (PVM) and a secondary VM (SVM) may each be hosted on separate servers or nodes (e.g., within a data center) and their states may be replicated. This replication of states may provide for an application-agnostic, software-implemented hardware fault tolerance solution for "non-stop-service". The fault tolerance solution may allow for the SVM to take over (failover) when the server hosting the PVM suffers a hardware failure and/or the PVM enters a fail state.

Lock-stepping is a fault tolerance solution that may replicate VM states per instruction. For example, PVM and SVM execute in parallel for deterministic instructions, but lock-step for non-deterministic instructions. However, lock-stepping may suffer from very large overhead when dealing with multiprocessor (MP) implementations, where each memory access might be non-deterministic.

Checkpointing is another fault tolerance solution that replicates a PVM state to the SVM at periodic epochs. For checkpointing, in order to guarantee a successful failover, all output packets may need to be buffered until a successful checkpoint has been completed. Buffering until a successful checkpoint in a VM environment may lead to extra network latency and overhead due to output packet buffering and frequent checkpoints.

COarse-grain LOck-stepping (COLO) is yet another fault tolerance solution that has both PVM and SVM being fed with a same request/data (input) network packets from a client. Logic supporting COLO may be capable of monitoring output responses of the PVM and SVM and consider the SVM's state as a valid replica of the PVM's state, as long as network responses (output) generated by the SVM match that of the PVM. If a given network response does not match, transmission of the network response to the client is withheld until the PVM state has been synchronized (force a new checkpoint) to the SVM state. Hence, COLO may ensure that a fault tolerant system is highly available via failover to the SVM. This high availability may exist even though non-determinism may mean that the SVM's internal state is different to that of the PVM, the SVM is equally valid and remains consistent from the point of view of external observers to the fault tolerant system that implements COLO. Thus, COLO may have advantages over pure lock-stepping or checkpointing fault tolerance solutions.

COLO fault tolerance solutions may take advantage of such protocols as those associated with the transport control protocol (TCP) stack. The TCP stack may be arranged to have a state per connection and may be capable of recovering from packet loss and/or packet re-ordering. COLO may include use of a per-TCP connection response packet comparison. The per-TCP connection response packet comparison may consider an SVM state as a valid replica if response packets of each TCP connection outputted from the PVM match response packets of each TCP connection outputted from the SVM. This matching is regardless of possible packet ordering across TCP connections.

BRIEF DESCRIPTION OF THE DRAWINGS

FIG. 7 illustrates an example of a first logic flow.
FIG. 8 illustrates an example of a second logic flow.
FIG. 9 illustrates an example of a third logic flow.
FIG. 10 illustrates an example of a storage medium.

DETAILED DESCRIPTION

Figure 1:
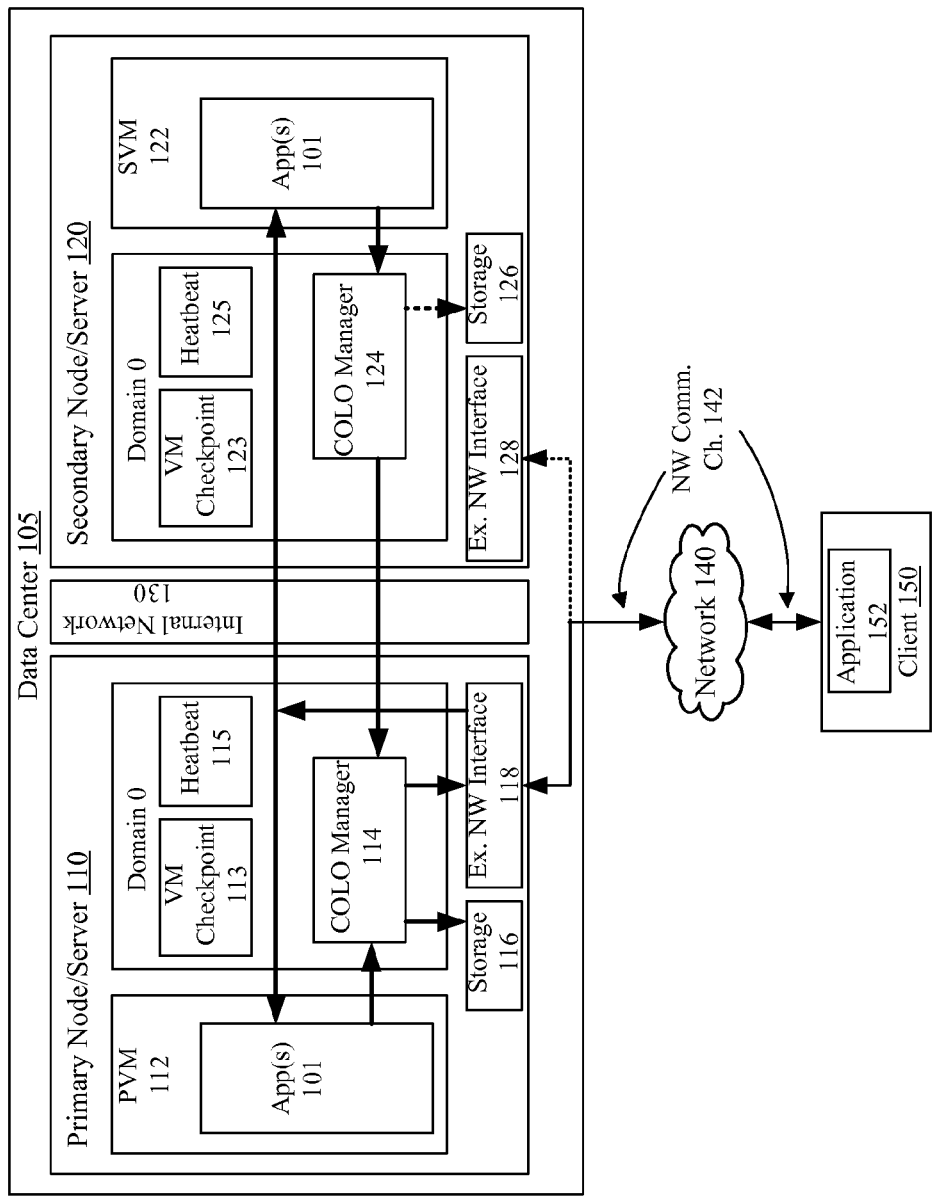
FIG. 1 illustrates an example first system.

As contemplated in the present disclosure, COLO may have advantages over pure lock-stepping or checkpointing fault tolerance solutions. COLO may greatly improve performance of a highly available fault tolerant system via use of servers that host a PVM and an SVM. However, performance of COLO depends on output similarity of each TCP connection. For example, the number of identical output packets per-TCP connection the PVM and SVM may generate or a duration the PVM and SVM may generate matching output packets for all TCP connections.

A potentially large impact on output similarity may be a programming model implemented by multi-threaded applications executed by a PVM or SVM. For example, a programming model for higher levels layers such as layers 5, 6 or 7 of the Open Systems Interconnection (OSI) model as described by the International Organization for Standardization (ISO) publication ISO/IEC 7498-1, published in June 1996. If a dedicated thread is used to generate a response packet per TCP connection, outputs will likely match between the PVM and SVM. This is called a single-session programming model. On the other hand, if the programming model for the higher OSI layers uses multiple threads (multi-session programming) that merge to a single TCP connection, the output similarity becomes problematic. Output similarity may become problematic because execution time of each thread in multi-session programming may be different between the PVM and the SVM. It is with respect to these challenges that the examples described herein are needed.

According to some first examples, techniques for remapping sessions for a multi-threaded application may include intercepting, at circuitry for a server arranged to host a PVM or an SVM capable of separately executing an application, first and second socket API calls made from the application. For these first examples, the first and second socket APIs may be arranged to route respective first and second sessions for expected output through a same TCP connection from among a plurality of TCP connections coupled to a client of the server. The first and second sessions may be generated by the application responsive to data received from the client. The techniques may also include generating a session index using respective first and second identifier information for the first and second sessions and then remapping the first and second sessions for actual output through separate TCP connections from among the plurality of TCP connections. The first and second sessions may be remapped such that the session index is capable of being used at the client to recombine the first and second sessions with the same TCP connection.

In some second examples, techniques for remapping sessions for a multi-threaded application may include receiving, at circuitry for a client coupled to a server via a plurality of TCP connections, first and second sessions via separate TCP connections from among the plurality of TCP connections. For these second examples, the first and second session may be generated by a first application executed by a PVM or an SVM hosted by the server and outputted from the server via the separate TCP connections. The first and second sessions may be generated responsive to a request previously sent to the first application by a second application at the client. The techniques may also include receiving a session index having identifier information for the first and second sessions and regrouping the first and second session to a same TCP connection from among the plurality of TCP connections based on the session index. The techniques may also include forwarding the first and second sessions via the same TCP connection to respective first and second socket APIs for the second application.

FIG. 1 illustrates an example first system. In some examples, as shown in FIG. 1, the first example system includes system 100. System 100 includes a data center 105 having a primary node/server 110 coupled with a secondary node/server 120 via an internal network 130. Also, as shown in FIG. 1, primary node 110 or secondary node 120 may be coupled to a client 150 via a network (NW) communication channel 142 routed through network 140.

According to some examples, primary node 110 and secondary node 120 may be arranged as part of a fault tolerance system. For these examples, primary node 110 may be arranged to host a PVM 112 and secondary node 120 may be arranged to host an SVM 122. Both PVM 112 and SVM 122 may be capable of separately executing the same application(s) 101. In some examples, application(s) 101 may utilize a multi-session programming model that includes routing multiple sessions to a same TCP connection. This type of multi-session programming model is described in more detail below.

In some examples, primary node 110 and secondary node 120 may each maintain respective heartbeats 115 and 125 to communicate health status for PVM 112 and SVM 122. For example, heartbeat 115 may relay health status information for PVM 112 to enable secondary node 120 to determine if PVM has failed or become unresponsive and thus requiring SVM 122 to failover and become the PVM to serve or handle requests from client 150. Similarly, heartbeat 125 may relay health status information for SVM 122 to enable primary node 110 to determine if SVM has failed or become unresponsive and thus requiring another SVM to be configured for providing fault tolerance for PVM 112.

According to some examples, PVM 112 and SVM 122 may operate within the same network domain 0 for processing requests received from an application 152 at client 150. For these examples, requests may be received over NW communication channel 142 through external NW interface 118 at primary node 110. The requests may than be routed simultaneously to application(s) 101 being executed at both PVM 112 and SVM 122. A COLO manager 114 at primary node 110 and a COLO manager 124 may monitor outputs/responses generated by application(s) 101. COLO managers 114 and 124 may withhold outputs/responses and at least temporarily store withheld outputs/responses in respective storages 116 and 126 if the outputs/responses do not match. COLO managers 114 and 124 may then force a new checkpoint (e.g., VM checkpoints 113 and 123) to cause SVM 122 to become synchronized with SVM 112.

In some examples, techniques may be executed that may decrease possible output disparities between application(s) 101 separately executed at PVM 112 and SVM 122 due to multi-session programming. As described more below, these techniques may include logic and/or features (not shown in FIG. 1) capable of decoupling sessions for expected output via a same TCP connection by remapping those sessions to different TCP sessions for actual output. The actual outputs/responses for the remapped TCP sessions may then be compared by COLO managers 114 and 124 to determine whether PVM 112 and SVM 122 are in a synchronized state. This comparison by COLO manages 114 and 124 typically relies on a per-TCP connection. Similar decoupling logic and/or features at client 150 may be capable of regrouping the sessions before delivering the outputs/responses to application 152 at client 150 via the same TCP connection that application(s) 101 originally expected to route these outputs/responses. Therefore, both application(s) 101 and application 152 may be unaware of this decoupling.

FIG. 1 depicts a type of hybrid virtual machine manager (VMM) model where a privilege guest operating system, such as domain 0, may be used to run a native device driver and manage other guests. In other examples, types of VMM models such as hypervisor model or a host-based model may be implemented at a data center similar to data center 105. For these other examples, the hypervisor model or the host-based model may be type-II VMM models. Meanwhile the hybrid VMM model shown in FIG. 1 may be a type-I VMM model. Examples are not limited exclusively to a type-I or a type-II VMM model. Examples for remapping sessions for a multi-threaded application may apply equally to both types of VMM models.

Figure 2:
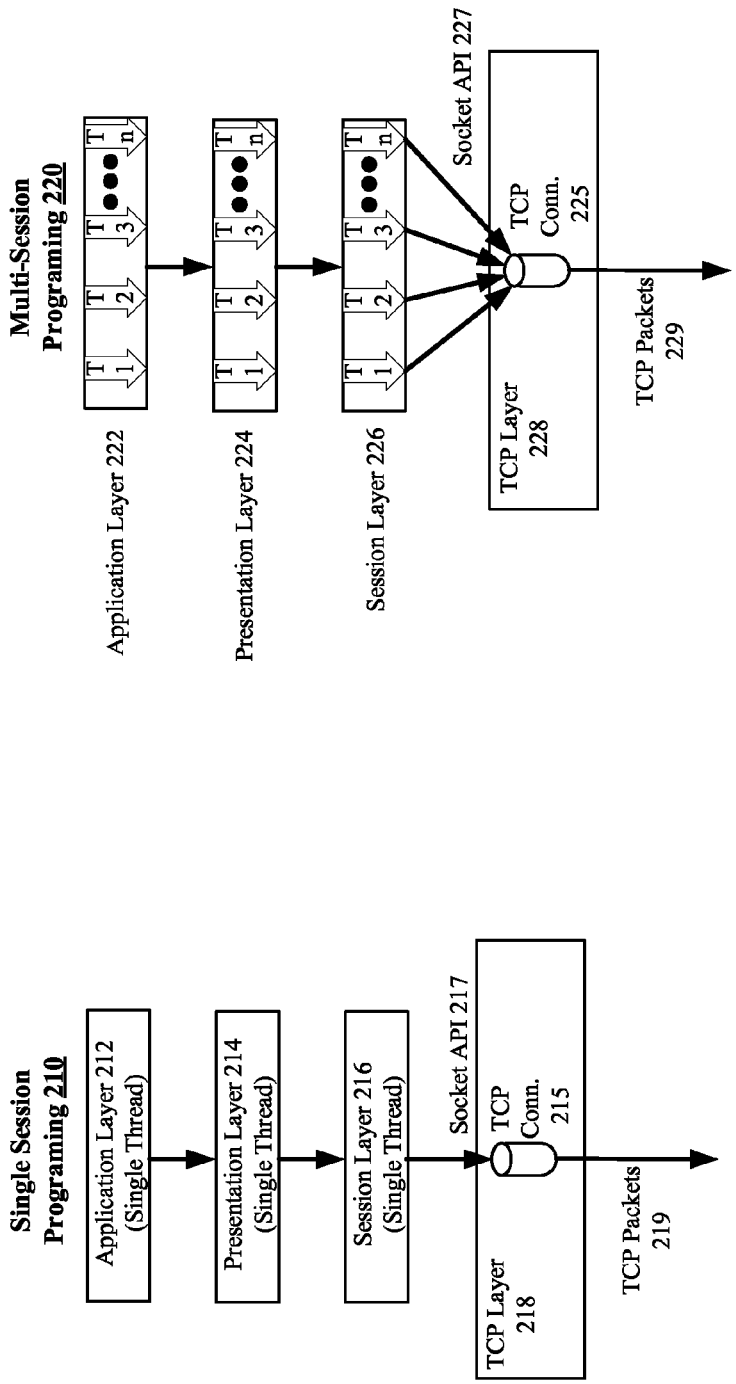
FIG. 2 illustrates example programming models.

FIG. 2 illustrates example programming models 200. In some examples, as shown in FIG. 2, single-session programming 210 may include use of a single thread for higher-level layer stack processing for application layer 212, presentation layer 214 and session layer 216. Outputs from this single thread may be routed at socket application interface (API) 217 via or through TCP connection 215 at TCP layer 218. For these examples, TCP packets 219 may then be sent or outputted to lower layers of an OSI protocol stack (e.g., network, data link or physical layers) for eventual delivery to a source of the request that lead to the generation of TCP packets 219. Use of single-session programming 210 when executed by an application executed by a PVM or a SVM may likely lead to similar outputs of TCP packets 219. Thus a COLO fault tolerance scheme may work well with this type of single-session programming.

According to some examples, as shown in FIG. 2, multi-session programming 220 may include use of multiple threads T1, T2, T3 and Tn, where "n" may be any positive whole integer greater than 3. For these examples, threads T1 to Tn may be used for higher-level layer stack processing for application layer 222, presentation layer 224 and session layer 226. Outputs for threads T1 to Tn may then be routed at socket API 227 via or through TCP connection 225 at TCP layer 228. TCP packets 229 may then be sent or outputted to lower layers of the OSI protocol stack for eventual delivery to a source of the request that lead to the generation of TCP packets 219. In contrast to single-session programming 210, use of multi-session programming 220 when executed by an application executed by a PVM or a SVM may likely lead to different outputs of TCP packets 219. As mentioned previously, that difference may be due to variations in execution times between each thread. These variations will likely increase as a number of threads used for multi-session programming 220 increases. Variations of outputs for TCP packets 219 between the PVM and SVM may be problematic to performance of a COLO fault tolerance scheme.

Figure 3:
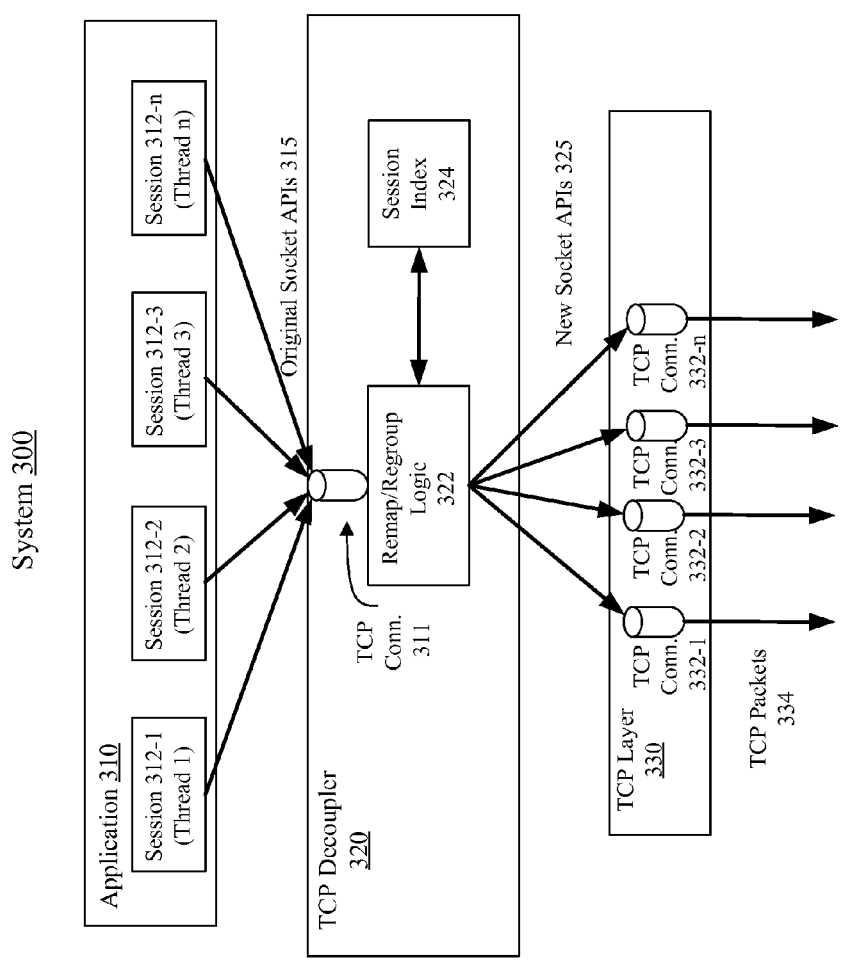
FIG. 3 illustrates an example second system.

FIG. 3 illustrates an example second system. As shown in FIG. 3, the example second system includes system 300. In some examples, system 300 may include an application 310 that may be executed by a either a PVM or SVM hosted by a node or server. The node or server may be located, for example, in a data center such as data center 105 shown in FIG. 1. Application 310 may also be executed at a client coupled to a server such as client 150 shown in FIG. 1. According to some examples, application 310 may be arranged to use a multi-session programming model that may include sessions 312-1, 312-2, 312-3 and 312-n being executed by respective threads 1, 2, 3 and n. For these examples, application 310 may call original socket APIs 315 to route sessions 312-1 to 312-n for expected output through a same TCP connection 311. The outputs may be associated or related to a received request (e.g., from a client to a server or vice versa from a server to a client)

In some examples, as shown in FIG. 3, system 300 may also include a TCP decoupler 320 located between session outputs for application 310 and a TCP layer 330. For these examples, TCP decoupler 320 may include a remap/regroup logic 322. Remap/regroup logic 322 may be capable of intercepting original socket APIs 315 arranged to route sessions 312-1 to 312-n for output through TCP connection 311. Remap/regroup logic 322 may also be capable of obtaining identifier information for sessions 312-1 to 312-n to generate a session index 324 and then remap sessions 312-1 to 312-n for actual output through separate TCP connections 332-1 to 332-n at TCP layer 330. Remap/regroup logic 322, for example, may call new socket APIs 325 to route sessions 312-1 to 312-n for actual outputs through TCP connections 332-1 to 332-n to cause TCP packets 334 to be outputted through these different TCP connections.

According to some examples, session index 324 may be communicated to the server or client that originated a requesting application that caused sessions 312-1 to 312-n to be outputted from application 310. In that regard, session index 324 may be capable of being used at the server or client to recombine sessions 312-1 to 312-n with TCP connection 311 before delivery to the requesting application. In some examples, the identifier information may include thread names or identifiers that may have been separately assigned (e.g., by application 310) to each of threads 1 to n. In some other examples, the identifier information may include protocol stack patterns associated with sessions 312-1 to 312-n such as a combination of a code pattern (e.g., including internet protocol (IP) addresses) associated with executing a protocol stack pattern for generating respective sessions 312-1 to 312-n.

In some examples, application 310 may utilize a dynamic link library (not shown) of socket APIs to route sessions 312-1 to 312-n for expected output through a plurality of TCP connections that includes TCP connection 311. For these examples, remap/regroup logic 322 may be capable of intercepting original socket APIs 315 by substituting the dynamic link library with a TCP decouple link library (not shown). The substituted TCP decouple link library may then be used to remap sessions 312-1 to 312-n for actual output through TCP connections 322-1 to 322-n. The decouple link library may be communicated along with session index 124 to enable the requestor client or server to recombine sessions 312-1 to 312-n with TCP connection 311 before delivering to the requesting application.

According to some examples, although not shown in FIG. 3, rather than deploy TCP decoupler 320 between application 310 and TCP layer 330. TCP decoupler 320 may be embedded insider layer 4 (TCP) software that may be included in TCP layer 330. For example, embedded in a kernel TCP/IP stack.

According to some examples, a requestor client may be capable of regrouping sessions 312-1 to 312-n to TCP connection 311 using a regrouping policy to include, but not limited to, a round-robin policy. Also, in the case of failover due to the primary node failing (e.g., hardware failure) internal TCP error control mechanisms may be utilized to recover a TCP state of a failed PVM via use of the SVM and still deliver response packets on a per-TCP connection basis that may then be regrouped according to the regrouping policy.

In some examples, remapping of sessions 312-1 to 312-n may improve per-TCP output similarity for a COLO manager at a primary or secondary node arranged to host a PVM or SVM when the outputs being monitored are for applications using multi-session programing models. Also, in some examples, session 312-1 to 312-n may be mapped to sets of TCP connections rather than a 1:1 mapping as shown in FIG. 3. For example, remapping from TCP connection 311 may include remapping according to a ratio of m:1, where "m" is any positive whole integer value greater than 1 and m sessions out of sessions 312-1 to 312-n may be mapped to share a single TCP connection out of TCP connections 332-1 to 332-n. Remapping from TCP connection 311 may also include remapping according to a ratio of m:o, where "o" is any positive whole integer value greater than m. For a ratio of m:o, m sessions out of sessions 312-1 to 312-n may be mapped to o TCP connections from among TCP connections 332-1 to 332-n. These ratios of 1:1, m:1 or m:o may be flexibly established based on needs of system that may utilize these remapping schemes. For example, TCP connections may be limited or plentiful in a given system and may also fluctuate based on demands of the given system. Hence, a ratio that fits the needs of the given system may be adjusted accordingly.

Figure 4:
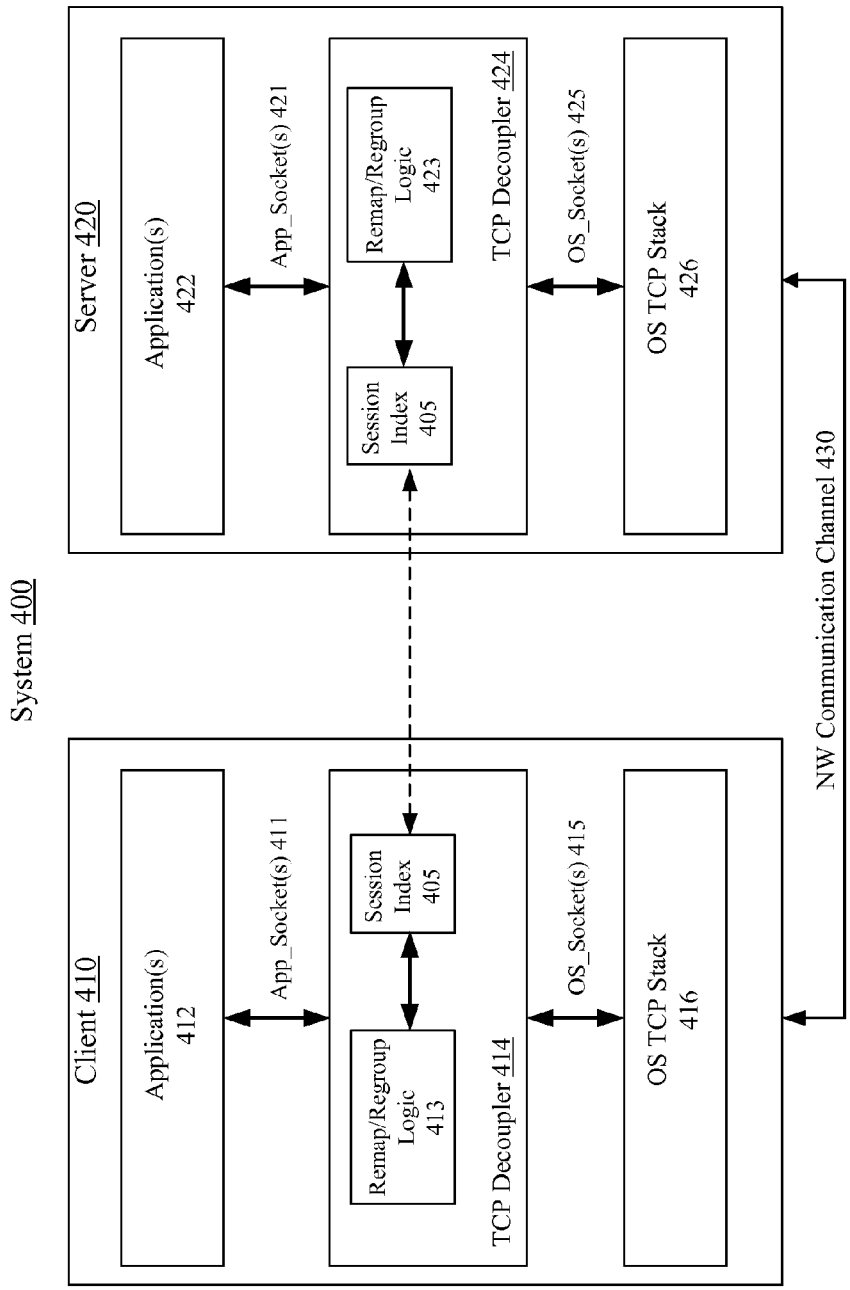
FIG. 4 illustrates an example third system.

FIG. 4 illustrates an example third system. As shown in FIG. 4, the example third system includes system 400. In some examples, as shown in FIG. 4, system 400 includes a client 410 coupled to a server 420 via a NW communication channel 430. For these examples, client 410 may include application(s) 412, a TCP decoupler 414 and an operating system (OS) TCP stack 416. Also, server 420 may include application(s) 422, a TCP decoupler 424 and an OS TCP stack 426. Server 420, for example, may be arranged to host a PVM or SVM (not shown) that may be capable of executing application(s) 422.

According to some examples, both application(s) 412 and 422 may include at least one application utilizing a multi-session programming model that calls respective App_Socket(s) 411 and 421 to route multiple sessions through a same TCP connection. Similar to TCP decoupler 320 described above for FIG. 3, TCP decoupler 414 and 424 may be capable of remapping sessions for actual output to respective OS_Socket(s) 415 via different TCP connections. For example, remap/regroup logic 423 of TCP decoupler 424 may intercept these sessions, obtain identifier information, generate a session index 405 and then remap the sessions for output to OS_Socket(s) 425 via different or separate TCP connections at OS TCP stack 426. OS TCP stack 426 may then route response TCP packets over NW communication channel 430 to client 410. Regroup Logic 413 of TCP decoupler 414 may then cause the sessions remapped to the different TCP connections to be regrouped with the same TCP connection that application(s) 422 originally mapped these sessions. Session index 405 may be used by TCP decoupler 414 to regroup the sessions with the same TCP connection for delivery to application(s) 412.

In some examples, remap/regroup logic 423 may be capable of selectively intercepting and rerouting sessions generated by application(s) 422. For example, application(s) 422 may include a first application that executes a single-session programming model and a second application that executes a multi-session programming model. Remap/regroup logic 423 may selectively intercept only the second application for remapping. Remap/regroup logic 423 may not choose the first application as single session programming does not suffer from possibly disparate outputs as is likely the case for multi-session programming that uses multiple threads. Therefore, remapping may not be needed for single session programming to improve output similarities between a PVM and an SVM hosted by server 420.

In some other examples, application(s) 422 may use multiple TCP connections and only a portion of these multiple TCP connections may be intercepted and remapped by remap/regroup logic 423. For example, if one TCP connection is used with a single session programming model, while another TCP connection is used with a multi-session programming model. For these other examples, only the other TCP connection used with the multi-session programming model may be intercepted.

Figure 5:
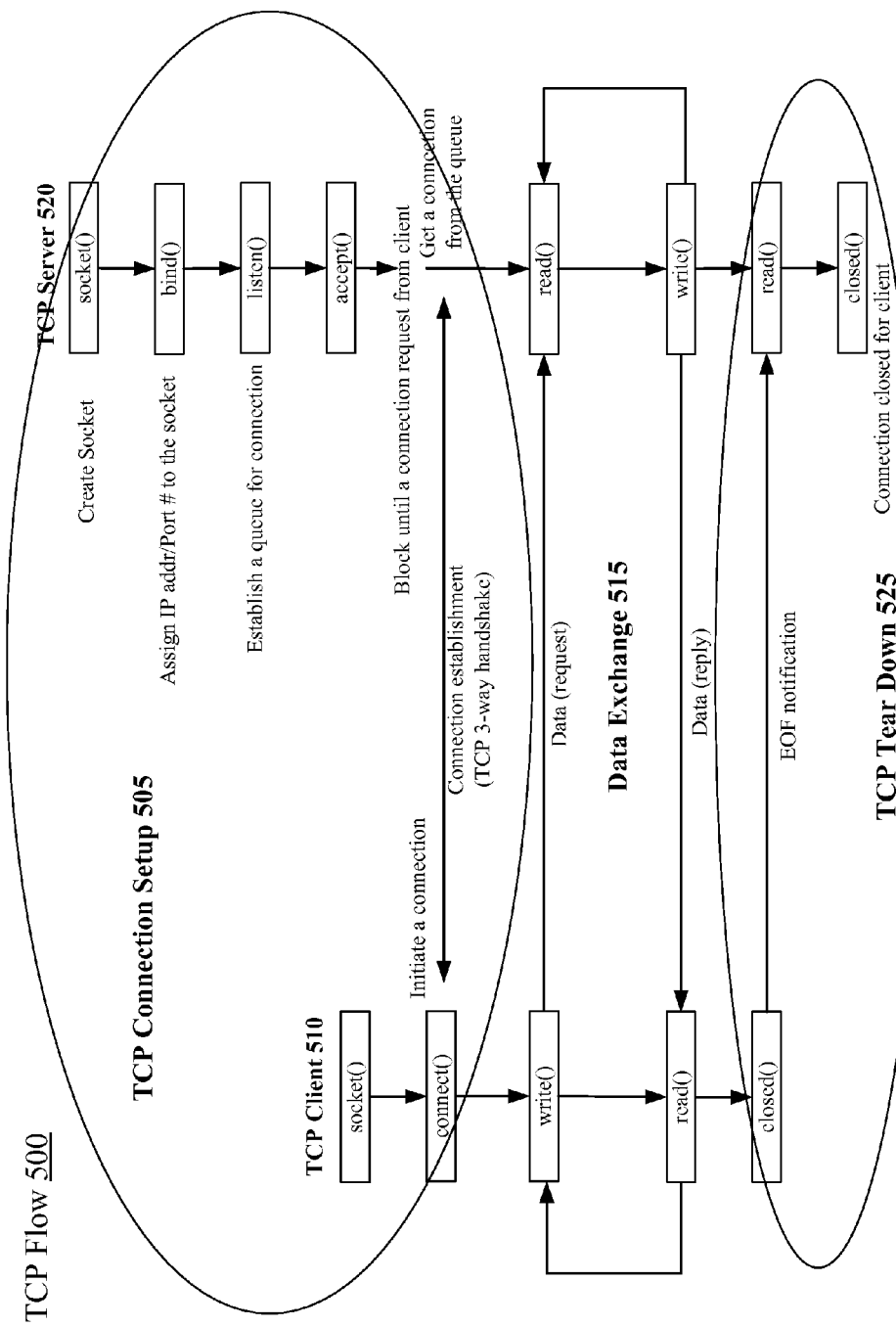
FIG. 5 illustrates an example TCP flow.

FIG. 5 illustrates an example TCP flow 500. In some examples, TCP flow 500 may be a paradigm of a TCP programming interface and may depict a flow of communication between a TCP client 510 and a TCP server 520. As shown in FIG. 5, TCP flow 500 may include various phases or stages for TCP programming to include a TCP connection setup 505, a data exchange 515 and a TCP teardown 525. According to some examples, a TCP decoupler such as TCP decoupler 320 or TCP decouplers 413/423 may be capable of API emulation in order to intercept socket APIs arranged to route multiple sessions for output to a same TCP connection. That API emulation may occur based on which of the various phases to include TCP connection setup 505, data exchange 515 or TCP teardown 525 for which that API emulation is targeted.

According to some examples, for API emulation at TCP connection setup 505, a TCP decoupler may intercept socket APIs for multiple sessions (shown in FIG. 5 as socket( )) and create multiple OS_socket APIs immediately for these intercepted socket APIs. For example, os_socket_x (x=1, 2, 3, . . . n), and then return the application with an app_socket_1. For these examples, the app_socket_1 may be valid in the TCP decoupler only. The application may create multiple other app_socket_x (x=2, 3 . . . ) as well. A same policy may be applied to the bind( ), listen( ), connect( ) and accept( ) API access of app_socket_1, by operation of the OS_socket layer bind( ), listen ( ), connect( ) and accept( ) to the os_socket_x (x=1, 2, . . . , n).

In some examples, API emulation at TCP connection setup 505 may also include the decoupler to emulate the socket( ), bind( ), listen( ), connect( ) and accept( ) APIs purely with internal software states without involving the os_socket layer access immediately. Instead, once it detects that TCP connection setup 505 is completed (e.g., TCP 3-way handshake is completed, the TCP decoupler starts to setup the os_socket layer connections os_socket_x (x=1, 2, 3, . . . n) and then maps with the app_socket_1 retuned in socket_1 returned in socket( ), using the os_socket layer socket( ), bind( ), listen( ), connect( ) and accept( ) APIs. In some examples, at TCP tear down 525, the TCP decoupler may then remove multiple sessions mapped to os_socket_x responsive to an end of file (EOF) message read at TCP server 520 that was sent from TCP client 510.

According to some examples, API emulation at data exchange 515 may include, for outbound data sessions, the TCP decoupler using a current [identifier for a given thread and/or name for the given thread and/or a caller function IP address] as a unique session index. The TCP decoupler may use the session index to address a fixed mapping table (such as a linear table) if os_socket_x connection ID, or use a hash table with collision chain to map from session to os_socket. For these examples, a guest OS task management component may be hooked to provide a unique identifier for each thread as well. Once the os_socket_x is selected, the TCP decoupler may send session data (e.g., a session index) using the write( ) API of the os_socket_x. On the other hand, client 510, once receiving the session data using read( ) API from multiple TCP connections, may combine them together and deliver regrouped sessions to a session layer at client 510.

Figure 6:
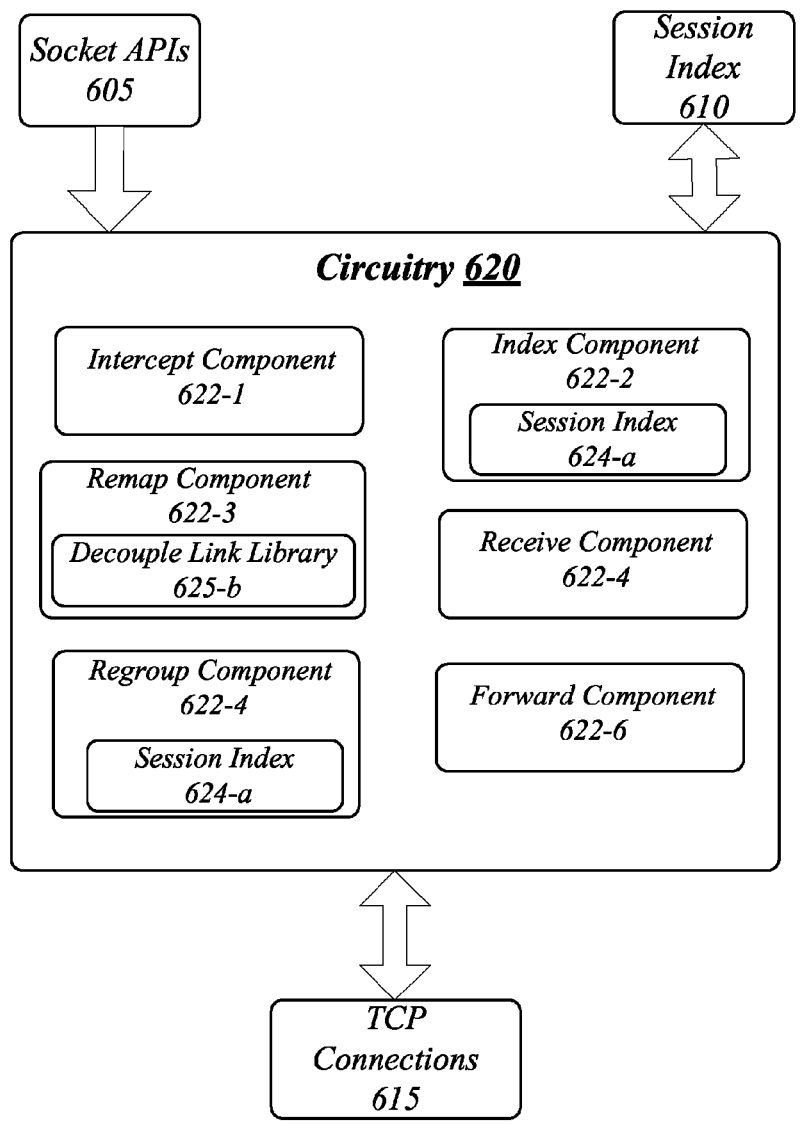
FIG. 6 illustrates an example block diagram for an apparatus.

FIG. 6 illustrates an example block diagram for an apparatus 600. As shown in FIG. 6, the first apparatus includes an apparatus 600. Although apparatus 600 shown in FIG. 6 has a limited number of elements in a certain topology, it may be appreciated that the apparatus 600 may include more or less elements in alternate topologies as desired for a given implementation.

The apparatus 600 may be supported by circuitry 620 maintained at a server or a client computing device. Circuitry 620 may be arranged to execute one or more software or firmware implemented modules or components 622-*a*. It is worthy to note that "a" and "b" and "c" and similar designators as used herein are intended to be variables representing any positive integer. Thus, for example, if an implementation sets a value for a=6, then a complete set of software or firmware for components 622-*a* may include components 622-1, 622-2, 622-3, 622-4, 622-5 or 622-6. The examples presented are not limited in this context and the different variables used throughout may represent the same or different integer values. Also, these "components" may be software/firmware stored in computer-readable media, and although the components are shown in FIG. 6 as discrete boxes, this does not limit these components to storage in distinct computer-readable media components (e.g., a separate memory, etc.).

According to some examples, circuitry 620 may include a processor or processor circuitry. Circuitry 620 may be part of circuitry at a server or client (e.g., primary node/server 110, secondary node/server 120, server 420 or client 410) that may include processing cores or elements. The circuitry including one or more processing cores can be any of various commercially available processors, including without limitation an AMDC® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 620 may also include an application specific integrated circuit (ASIC) and at least some components 622-*a* may be implemented as hardware elements of the ASIC.

According to some first examples, apparatus 600 may be at a server coupled with a client via a plurality of TCP connections 615, the server may be arranged to host a PVM or an SVM capable of separately executing a first application. For these first examples, apparatus 600 may include an intercept component 622-1. Intercept component 622-1 may be executed by circuitry 620 to intercept first and second socket API calls made from the first application. In some examples, the first and second socket APIs may be included in socket APIs 605. Socket APIs 605 may be arranged to route sessions generated by the first application to a same TCP connection from among TCP connections 615. The sessions generated responsive to a request received from a second application at the client.

According to some first examples, apparatus 600 may also include an index component 622-2. Index component 622-2 may be executed by circuitry 620 to generate a session index using identifier information for the sessions generated by the first application. For these examples, index component 622-2 may maintain or store the generated session index in a data structure (e.g., a lookup table (LUT) that includes session index 624-a. Also, the generated session index may be communicated to the client via session index 610.

In the first examples, apparatus 600 may also include a remap component 622-3. Remap component 622-3 may be executed by circuitry 620 to remap the sessions generated by the first application for actual output through separate TCP connections from among TCP connections 615. For these examples, the sessions may be remapped such that session index 610 may be used at the client to recombine the first and second sessions with the same TCP connection for delivery to the second application at the client. In some examples, remap component 622-3 may be capable of using decouple link library 625-b (e.g., maintained in a LUT) to remap the sessions to the separate TCP connections.

According to some second examples, apparatus 600 may be at a client coupled to a server via TCP connections 615. Similar to the first examples, the server may be arranged to host a PVM or an SVM capable of separately executing a first application. For these second examples, apparatus 600 may also include a receive component 622-4. Receive component 622-4 may be executed by circuitry 620 to receive first and second sessions generated by the first application via separate TCP connections from among TCP connections 615. The first and second sessions may have been generated responsive to a request previously sent to the first application by a second application at the client.

According to some second examples, apparatus 600 at the client may also include index component 622-2 as mentioned above for the first examples. Index component 622-2 for these second examples may receive session index 610 having identifier information for the first and second sessions. Index component 622-2, for example, may maintain or store the received session index 610 in a data structure such as a LUT that includes session index 624-a.

According to some second examples, apparatus 600 may also include a regroup component 622-5. Regroup component 622-5 may be executed by circuitry 620 to regroup the first and second sessions to a same TCP connection from among TCP connections 615 based on the session index that was stored or maintained at session index 624-a.

According to some second examples, apparatus 600 may also include a forward component 622-6. Forward component 622-6 may be executed by circuitry 620 to forward the first and second sessions via the same TCP connection to respective first and second socket APIs for the second application at the client.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 7 illustrates an example of a first logic flow. As shown in FIG. 7 the first logic flow includes a logic flow 700. Logic flow 700 may be representative of some or all of the operations executed by one or more logic, features, or devices described herein, such as apparatus 600. More particularly, logic flow 700 may be implemented by at least intercept component 622-1, index component 622-2 or remap component 622-3.

According to some examples, logic flow 700 at block 702 may intercept, at circuitry for a server arranged to host a primary or a secondary VM capable of separately executing an application, first and second socket API calls made from the application. The first and second socket APIs arranged to route respective first and second sessions for expected output through a same TCP connection from among a plurality of TCP connections coupled to a client of the server. The first and second sessions generated by the application responsive to data received from the client. For these examples, intercept component 622-1 may intercept the first and second socket APIs.

In some examples, logic flow 700 at block 704 may generate a session index using respective first and second identifier information for the first and second sessions. For these examples, index component 622-2 may generate the session index.

According to some examples, logic flow 700 at block 706 may remap the first and second sessions for actual output through separate TCP connections from among the plurality of TCP connections such that the session index is capable of being used at the client to recombine the first and second sessions with the same TCP connection. For these examples, remap component 622-3 may remap the first and second sessions.

FIG. 8 illustrates an example of a second logic flow. As shown in FIG. 8 the second logic flow includes a logic flow 800. Logic flow 800 may be representative of some or all of the operations executed by one or more logic, features, or devices described herein, such as apparatus 600. More particularly, logic flow 800 may be implemented by at least receive component 622-4, index component 622-2, regroup component 622-5 or forward component 622-6.

According to some examples, logic flow 800 at block 802 may receive, at a server arranged to host a primary or a secondary VM capable of separately executing an application, first and second sessions via separate TCP connections with a client. The first and second sessions generated by a second application at the client responsive to a request previously sent to the second application from the first application. For these examples, receive component 622-4 may receive the first and second sessions.

In some examples, logic flow 800 at block 804 may receive a session index having identifier information for the first and second sessions. For these examples, index component 622-2 may receive the session index.

According to some examples, logic flow 800 at block 806 may regroup the first and second sessions to a same TCP connection based on the session index. For these examples, regroup component 622-5 may regroup the first and second sessions.

In some examples, logic flow 800 at block 808 may forward the first and second sessions via the same TCP connection to respective first and second socket APIs for the first application. For these examples, forward component 622-6 may forward the first and second sessions to the first application at the server.

FIG. 9 illustrates an example of a third logic flow. As shown in FIG. 10 the third logic flow includes a logic flow 900. Logic flow 900 may be representative of some or all of the operations executed by one or more logic, features, or devices described herein, such as apparatus 600. More particularly, logic flow 900 may be implemented by at least receive component 622-4, index component 622-2, regroup component 622-5 or forward component 622-6.

According to some examples, logic flow 900 at block 902 may receive, at circuitry for a client coupled to a server via a plurality of TCP connections, first and second sessions via separate TCP connections from among the plurality of TCP connections. The first and second session generated by a first application executed by a primary or a secondary virtual machine hosted by the server and outputted from the server via the separate TCP connections. The first and second sessions generated responsive to a request previously sent to the first application by a second application at the client. For these examples, receive component 622-4 may receive the first and second sessions.

In some examples, logic flow 900 at block 904 may receive a session index having identifier information for the first and second sessions. For these examples, index component 622-2 may receive the session index.

According to some examples, logic flow 900 at block 906 may regroup the first and second sessions to a same TCP connection based on the session index. For these examples, regroup component 622-5 may regroup the first and second sessions.

In some examples, logic flow 900 at block 908 may forward the first and second sessions via the same TCP connection to respective first and second socket APIs for the second application. For these examples, forward component 622-6 may forward the first and second sessions to the second application at the client.

Figure 11:
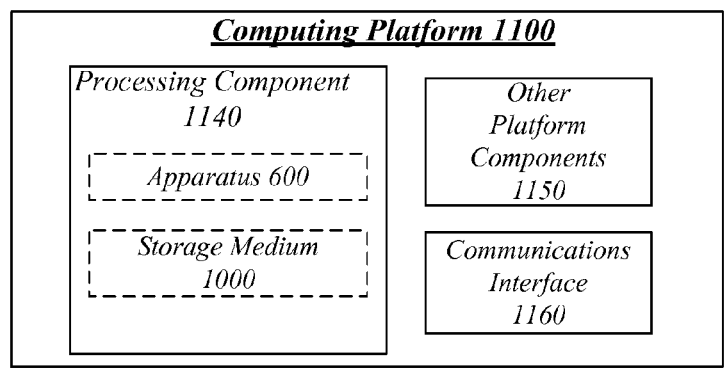
FIG. 11 illustrates an example computing platform.

FIG. 10 illustrates an example of a first storage medium. As shown in FIG. 11, the first storage medium includes a storage medium 1000. The storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flows 700, 800 or 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

FIG. 11 illustrates an example computing platform 1100. In some examples, as shown in FIG. 11, computing platform 1100 may include a processing component 1140, other platform components 1150 or a communications interface 1160. According to some examples, computing platform 1100 may be implemented in server or client computing device capable of coupling via a NW communication channel.

According to some examples, processing component 1140 may execute processing operations or logic for apparatus 600 and/or storage medium 1000. Processing component 1140 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1150 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1160 may include logic and/or features to support a communication interface. For these examples, communications interface 1160 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification.

As mentioned above computing platform 1100 may be implemented in a server or client computing device. Accordingly, functions and/or specific configurations of computing platform 1100 described herein, may be included or omitted in various embodiments of computing platform 1100, as suitably desired for a server or client computing device.

The components and features of computing platform 1100 may be implemented using any combination of discrete circuitry, application specific integrated circuits (ASICs), logic gates and/or single chip architectures. Further, the features of computing platform 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

EXAMPLE 1

An example apparatus may include circuitry at a server coupled to a client via a plurality of TCP connections. For these examples, the server may be arranged to host a primary or a secondary VM capable of separately executing a first application. The apparatus may also include an intercept component for execution by the circuitry to intercept first and second socket API calls made from the first application. The first and second socket APIs may be arranged to route respective first and second sessions for expected output through a same TCP connection from among the plurality of TCP connections. The first and second sessions may be generated by the first application responsive to a request received from a second application at the client. The apparatus may also include an index component for execution by the circuitry to generate a session index using respective first and second identifier information for the first and second sessions. The apparatus may also include a remap component for execution by the circuitry to remap the first and second sessions for actual output through separate TCP connections from among the plurality of TCP connections such that the session index is capable of being used at the client to recombine the first and second sessions with the same TCP connection for delivery to the second application.

EXAMPLE 2

The apparatus of example 1 may also include the intercept component intercepting the first and second socket APIs by substituting a dynamic link library of socket APIs used by the application to route sessions for expected output through the plurality of TCP connections to the client. For these examples, the dynamic link library may be substituted with a TCP decouple link library. The apparatus may also include the remap component remapping the first and second sessions by using the TCP decouple link library to cause the first and second sessions to be actually outputted to the client through the separate TCP connections.

EXAMPLE 3

The apparatus of example 1, the intercept component may intercept the first and second socket APIs by the intercept component emulating the first and second socket APIs based on one of a TCP connection setup with the client or a TCP data exchange with the client.

EXAMPLE 4

The apparatus of example 3 may also include the intercept component emulating the first and second socket APIs based on the TCP connection setup. For these examples, the intercept component may create multiple OS socket APIs for the first and second socket APIs and assign the multiple OS socket APIS to the separate TCP connections. The apparatus of example 3 may also include the remap component remapping the first and second sessions to use the multiple OS socket APIs to cause the first and second session to be actually outputted to the client through the separate TCP connections.

EXAMPLE 5

The apparatus of example 4 may also include the intercept component removing the multiple OS socket APIs for the first and second socket APIs responsive to an EOF message for a TCP tear down with the client.

EXAMPLE 6

The apparatus of example 3 may also include the intercept component emulating the first and second socket APIs based on the TCP data exchange and use the session index to address a fixed mapping table that maps the first and second sessions to multiple OS socket APIs assigned to the separate TCP connections. The apparatus of example 3 may also include the remap component to remap the first and second sessions based on the fixed mapping table to cause the first and second sessions to be actually outputted to the client through the separate TCP connections.

EXAMPLE 7

The apparatus of example 1, the intercept component may intercept the first and second socket APIs based on the application being selectively chosen for interception while another application capable of being executed by the primary or the secondary VM is not chosen for interception.

EXAMPLE 8

The apparatus of example 1, the first and second identifier information may include a first thread name or identifier assigned to a first thread used to generate the first session and a second thread name or identifier assigned to a second thread used to generate the second session.

EXAMPLE 9

The apparatus of example 1, the first and second identifier information may include a first protocol stack pattern that includes a first IP address associated with generation of the first session, and a second protocol stack pattern that includes a second IP address associated with generation of the second session.

EXAMPLE 10

The apparatus of example 1 may also include a digital display coupled to the circuitry to present a user interface view.

EXAMPLE 11

An example method may include intercepting, at circuitry for a server arranged to host a primary or a secondary VM capable of separately executing an application, first and second socket API calls made from the application. For these examples, the first and second socket APIs may be arranged to route respective first and second sessions for expected output through a same TCP connection from among a plurality of TCP connections coupled to a client of the server. The first and second sessions may be generated by the application responsive to data received from the client. The method may also include generating a session index using respective first and second identifier information for the first and second sessions. The method may also include remapping the first and second sessions for actual output through separate TCP connections from among the plurality of TCP connections such that the session index is capable of being used at the client to recombine the first and second sessions with the same TCP connection.

EXAMPLE 12

The method of example 11 intercepting the first and second socket APIs may include substituting a dynamic link library of socket APIs used by the application to route sessions for expected output through the plurality of TCP connections to the client. For these examples, the dynamic link library may be substituted with a TCP decouple link library. Also for the method of example 11, remapping the first and second sessions may include using the TCP decouple link library to cause the first and second sessions to be actually outputted to the client through the separate TCP connections.

EXAMPLE 13

The method of example 11, intercepting the first and second socket APIs may include emulating the first and second socket APIs based on one of a TCP connection setup with the client or a TCP data exchange with the client.

EXAMPLE 14

The method of example 13, emulating the first and second socket APIs based on the TCP connection setup may include creating multiple OS socket APIs for the first and second socket APIs. For these examples, the multiple OS socket APIs may be assigned to the separate TCP connections. The method of example 13 may also include remapping the first and second sessions such that using the multiple OS socket APIs may cause the first and second session to be actually outputted to the client through the separate TCP connections.

EXAMPLE 15

The method of example 14 may include removing the multiple OS socket APIs for the first and second socket APIs responsive to an EOF message for a TCP tear down with the client.

EXAMPLE 16

The method of example 13, emulating the first and second socket APIs based on the TCP data exchange may include using the session index to address a fixed mapping table that maps the first and second sessions to multiple OS socket APIs assigned to the separate TCP connections. For the method of example 13, remapping the first and second sessions may include using the fixed mapping table to cause the first and second sessions to be actually outputted to the client through the separate TCP connections.

EXAMPLE 17

The method of example 11, intercepting the first and second socket APIs may include intercepting based on the application being selectively chosen for interception while another application capable of being executed by the primary or the secondary VM is not chosen for interception.

EXAMPLE 18

The method of example 11, the first and second identifier information may include a first thread name or identifier assigned to a first thread used to generate the first session and a second thread name or identifier assigned to a second thread used to generate the second session.

EXAMPLE 19

The method of example 11, the first and second identifier information may include a first protocol stack pattern having a first IP address associated with generation of the first session, and a second protocol stack pattern including a second IP address associated with generation of the second session.

EXAMPLE 20

At least one machine readable medium may include a plurality of instructions that in response to being executed by system at a server may cause the system to carry out a method according to any one of examples 11 to 19.

EXAMPLE 21

An apparatus may include means for performing the methods of any one of examples 11 to 19.

EXAMPLE 22

An example at least one machine readable medium may include a plurality of instructions that in response to being executed by a system at a server arranged to host a primary or a secondary VM capable of separately executing a first application may cause the system to receive first and second sessions via separate TCP connections with a client. The first and second sessions may be generated by a second application at the client responsive to a request previously sent to the second application from the first application. The instructions may also cause the system to receive a session index having identifier information for the first and second sessions. The instructions may also cause the system to regroup the first and second sessions to a same TCP connection based on the session index. The instructions may also cause the system to forward the first and second sessions via the same TCP connection to respective first and second socket APIs for the first application.

EXAMPLE 23

The at least one machine readable medium of example 22, the identifier information may include a first thread name or identifier assigned to a first thread used to generate the first session for the first application and a second thread name or identifier assigned to a second thread used to generate the second session for the first application.

EXAMPLE 24

The at least one machine readable medium of example 22, the identifier information may include a first protocol stack pattern including a first IP address associated with generation of the first session, and a second protocol stack pattern including a second IP address associated with generation of the second session.

EXAMPLE 25

The at least one machine readable medium of example 22, the instructions may further cause the system to regroup the first and second session sessions to the same TCP connection using a same round-robin policy as used at the server to remap the first and second sessions from the same TCP connection at the server to the separate TCP connections.

EXAMPLE 26

An example apparatus may include circuitry at a client coupled to a server via a plurality of TCP connections. For these examples, the server may be arranged to host a primary or a secondary VM capable of separately executing a first application. The apparatus may also include a receive component for execution by the circuitry to receive first and second sessions generated by the first application via separate TCP connections from among the plurality of TCP connections. The first and second sessions may be generated responsive to a request previously sent to the first application by a second application at the client. The apparatus may also include an index component for execution by the circuitry to receive a session index having identifier information for the first and second sessions. The apparatus may also include a regroup component for execution by the circuitry to regroup the first and second sessions to a same TCP connection from among the plurality of TCP connections based on the session index. The apparatus may also include a forward component for execution by the circuitry to forward the first and second sessions via the same TCP connection to respective first and second socket APIs for the second application.

EXAMPLE 28

The apparatus of example 26, the identifier information may include a first thread name or identifier assigned to a first thread used to generate the first session for the first application, and a second thread name or identifier assigned to a second thread used to generation the second session for the first application.

EXAMPLE 29

The apparatus of example 26, the identifier information may include a first protocol stack pattern including a first IP address associated with generation of the first session, and a second protocol stack pattern including a second IP address associated with generate of the second session.

EXAMPLE 30

The apparatus of example 26 may also include a digital display coupled to the processor circuit to present a user interface view.

EXAMPLE 31

An example method may include receiving, at circuitry for a client coupled to a server via a plurality of TCP connections, first and second sessions via separate TCP connections from among the plurality of TCP connections. For these examples, the first and second sessions may be generated by a first application executed by a primary or a secondary virtual machine hosted by the server and outputted from the server via the separate TCP connections. The first and second sessions may be generated responsive to a request previously sent to the first application by a second application at the client. The method may also include receiving a session index having identifier information for the first and second sessions. The method may also include regrouping the first and second session to a same TCP connection from among the plurality of TCP connections based on the session index. The method may also include forwarding the first and second sessions via the same TCP connection to respective first and second socket APIs for the second application.

EXAMPLE 32

The method of example 31, the identifier information includes a first thread name or identifier assigned to a first thread used to generate the first session for the first application and a second thread name or identifier assigned to a second thread used to generate the second session for the first application.

EXAMPLE 33

The method of example 31, the identifier information may include a first protocol stack pattern including a first IP address associated with generation of the first session, and a second protocol stack pattern including a second IP address associated with generation of the second session.

EXAMPLE 34

The method of example 31, regrouping the first and second session sessions to the same TCP connection may include using a same round-robin policy as used at the server to remap the first and second sessions from the same TCP connection at the server to the separate TCP connections.

EXAMPLE 35

At least one machine readable medium comprising a plurality of instructions that in response to being executed by system at client coupled to a server may cause the system to carry out a method according to any one of examples 31 to 34.

EXAMPLE 36

An apparatus may include means for performing the methods of any one of examples 31 to 34.

EXAMPLE 37

At least one machine readable medium may include a plurality of instructions that in response to being executed by a system at a client coupled to a server via a plurality of TCP connections, the server may be arranged to host a primary or a secondary VM capable of separately executing a first application, the instructions may cause the system to receive first and second sessions via separate TCP connections from among the plurality of TCP connections. For these examples, the first and second sessions may be generated by the first application and outputted from the server via the separate TCP connections. The first and second sessions may be generated responsive to a request previously sent to the first application by a second application at the client. The instructions may also cause the system to receive a session index having identifier information for the first and second sessions. The instructions may also cause the system to regroup the first and second session to a same TCP connection from among the plurality of TCP connections based on the session index. The instructions may also cause the system to forward the first and second sessions via the same TCP connection to respective first and second socket APIs for the second application.

EXAMPLE 38

The at least one machine readable medium of example 37, the identifier information may include a first thread name or identifier assigned to a first thread used to generate the first session for the first application and a second thread name or identifier assigned to a second thread used to generate the second session for the first application.

EXAMPLE 39

The at least one machine readable medium of example 37, the identifier information may include a first protocol stack pattern including a first IP address associated with generation of the first session, and a second protocol stack pattern including a second IP address associated with generate of the second session.

EXAMPLE 40

The at least one machine readable medium of example 37, the first and second session sessions regrouped to the same TCP connection may include using a same round-robin policy as used at the server to remap the first and second sessions from the same TCP connection at the server to the separate TCP connections.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry at a server coupled to a client via a plurality of transport control protocol (TCP) connections, the server arranged to host a primary or a secondary virtual machine (VM) capable of separately executing a first application;
   an intercept component for execution by the circuitry to intercept first and second socket application interface (API) calls made from the first application, the first and second socket APIs arranged to route respective first and second sessions for expected output through a same TCP connection from among the plurality of TCP connections, the first and second sessions generated by the first application responsive to a request received from a second application at the client;
   an index component for execution by the circuitry to generate a session index using respective first and second identifier information for the first and second sessions; and
   a remap component for execution by the circuitry to remap the first and second sessions for actual output through separate TCP connections from among the plurality of TCP connections such that the session index is capable of being used at the client to recombine the first and second sessions with the same TCP connection for delivery to the second application.

2. The apparatus of claim 1, comprising:
   the intercept component to intercept the first and second socket APIs by substituting a dynamic link library of socket APIs used by the application to route sessions for expected output through the plurality of TCP connections to the client, the dynamic link library substituted with a TCP decouple link library; and
   the remap component to remap the first and second sessions includes using the TCP decouple link library to cause the first and second sessions to be actually outputted to the client through the separate TCP connections.

3. The apparatus of claim 1, the intercept component to intercept the first and second socket APIs comprises the intercept component to emulate the first and second socket APIs based on one of a TCP connection setup with the client or a TCP data exchange with the client.

4. The apparatus of claim 3, comprising:
   the intercept component to emulate the first and second socket APIs based on the TCP connection setup, the intercept component to create multiple operating system (OS) socket APIs for the first and second socket APIs and assign the multiple OS socket APIs to the separate TCP connections; and
   the remap component to remap the first and second sessions to use the multiple OS socket APIs to cause the first and second session to be actually outputted to the client through the separate TCP connections.

5. The apparatus of claim 4, comprising:
   the intercept component to remove the multiple OS socket APIs for the first and second socket APIs responsive to an end of file (EOF) message for a TCP tear down with the client.

6. The apparatus of claim 3, comprising:
   the intercept component to emulate the first and second socket APIs based on the TCP data exchange and use the session index to address a fixed mapping table that maps the first and second sessions to multiple operating system (OS) socket APIs assigned to the separate TCP connections; and
   the remap component to remap the first and second sessions based on the fixed mapping table to cause the first and second sessions to be actually outputted to the client through the separate TCP connections.

7. The apparatus of claim 1, the intercept component to intercept the first and second socket APIs based on the application being selectively chosen for interception while another application capable of being executed by the primary or the secondary VM is not chosen for interception.

8. The apparatus of claim 1, the first and second identifier information comprises a first thread name or identifier assigned to a first thread used to generate the first session and a second thread name or identifier assigned to a second thread used to generate the second session.

9. The apparatus of claim 1, the first and second identifier information comprises a first protocol stack pattern including a first internet protocol (IP) address associated with generation of the first session and a second protocol stack pattern including a second IP address associated with generation of the second session.

10. The apparatus of claim 1, comprising a digital display coupled to the circuitry to present a user interface view.

11. At least one non-transitory machine readable medium comprising a plurality of instructions that in response to being executed by a system at a server arranged to host a primary or a secondary virtual machine (VM) capable of separately executing a first application, the instructions to cause the system to:
   receive first and second sessions via separate transport control protocol (TCP) connections with a client, the first and second sessions generated by a second application at the client responsive to a request previously sent to the second application from the first application;
   receive a session index having identifier information for the first and second sessions;

regroup the first and second sessions to a same TCP connection based on the session index; and forward the first and second sessions via the same TCP connection to respective first and second socket application interfaces (APIs) for the first application.

12. The at least one non-transitory machine readable medium of claim 11, the identifier information comprises a first thread name or identifier assigned to a first thread used to generate the first session for the first application and a second thread name or identifier assigned to a second thread used to generate the second session for the first application.

13. The at least one non-transitory machine readable medium of claim 11, the identifier information comprises a first protocol stack pattern including a first internet protocol (IP) address associated with generation of the first session, and a second protocol stack pattern including a second IP address associated with generation of the second session.

14. The at least one non-transitory machine readable medium of claim 11, the instructions to further cause the system to regroup the first and second sessions to the same TCP connection using a same round-robin policy as used at the server to remap the first and second sessions from the same TCP connection at the server to the separate TCP connections.

15. A method comprising:

receiving, at circuitry for a client coupled to a server via a plurality of transport control protocol (TCP) connections, first and second sessions via separate TCP connections from among the plurality of TCP connections, the first and second sessions generated by a first application executed by a primary or a secondary virtual machine hosted by the server and outputted from the server via the separate TCP connections, the first and second sessions generated responsive to a request previously sent to the first application by a second application at the client;

receiving a session index having identifier information for the first and second sessions;

regrouping the first and second session to a same TCP connection from among the plurality of TCP connections based on the session index; and forwarding the first and second sessions via the same TCP connection to respective first and second socket application interfaces (APIs) for the second application.

16. The method of claim 15, the identifier information comprises a first thread name or identifier assigned to a first thread used to generate the first session for the first application and a second thread name or identifier assigned to a second thread used to generate the second session for the first application.

17. The method of claim 15, the identifier information comprises a first protocol stack pattern including a first internet protocol (IP) address associated with generation of the first session, and a second protocol stack pattern including a second IP address associated with generation of the second session.

18. The method of claim 15, regrouping the first and second session sessions to the same TCP connection comprises using a same round-robin policy as used at the server to remap the first and second sessions from the same TCP connection at the server to the separate TCP connections.

19. At least one non-transitory machine readable medium comprising a plurality of instructions that in response to being executed by a system at a client coupled to a server via a plurality of transport control protocol (TCP) connections, the server arranged to host a primary or a secondary virtual machine (VM) capable of separately executing a first application, the instructions to cause the system to:

receive first and second sessions via separate TCP connections from among the plurality of TCP connections, the first and second session generated by the first application and outputted from the server via the separate TCP connections, the first and second sessions generated responsive to a request previously sent to the first application by a second application at the client;

receive a session index having identifier information for the first and second sessions;

regroup the first and second session to a same TCP connection from among the plurality of TCP connections based on the session index; and forward the first and second sessions via the same TCP connection to respective first and second socket application interfaces (APIs) for the second application.

20. The at least one non-transitory machine readable medium of claim 19, the identifier information comprises a first thread name or identifier assigned to a first thread used to generate the first session for the first application and a second thread name or identifier assigned to a second thread used to generate the second session for the first application.

21. The at least one non-transitory machine readable medium of claim 19, the first and second identifier information comprises a first protocol stack pattern including a first a first internet protocol (IP) address associated with generation of the first session and a second protocol stack pattern including a second IP address associated with generation of the second session.

22. The at least one non-transitory machine readable medium of claim 19, the first and second session sessions regrouped to the same TCP connection comprises using a same round-robin policy as used at the server to remap the first and second sessions from the same TCP connection at the server to the separate TCP connections.

* * * * *